May 20, 1941.  W. BISSET  2,242,206
LOADING AND UNLOADING CONVEYER APPARATUS
Filed March 2, 1939   14 Sheets-Sheet 2
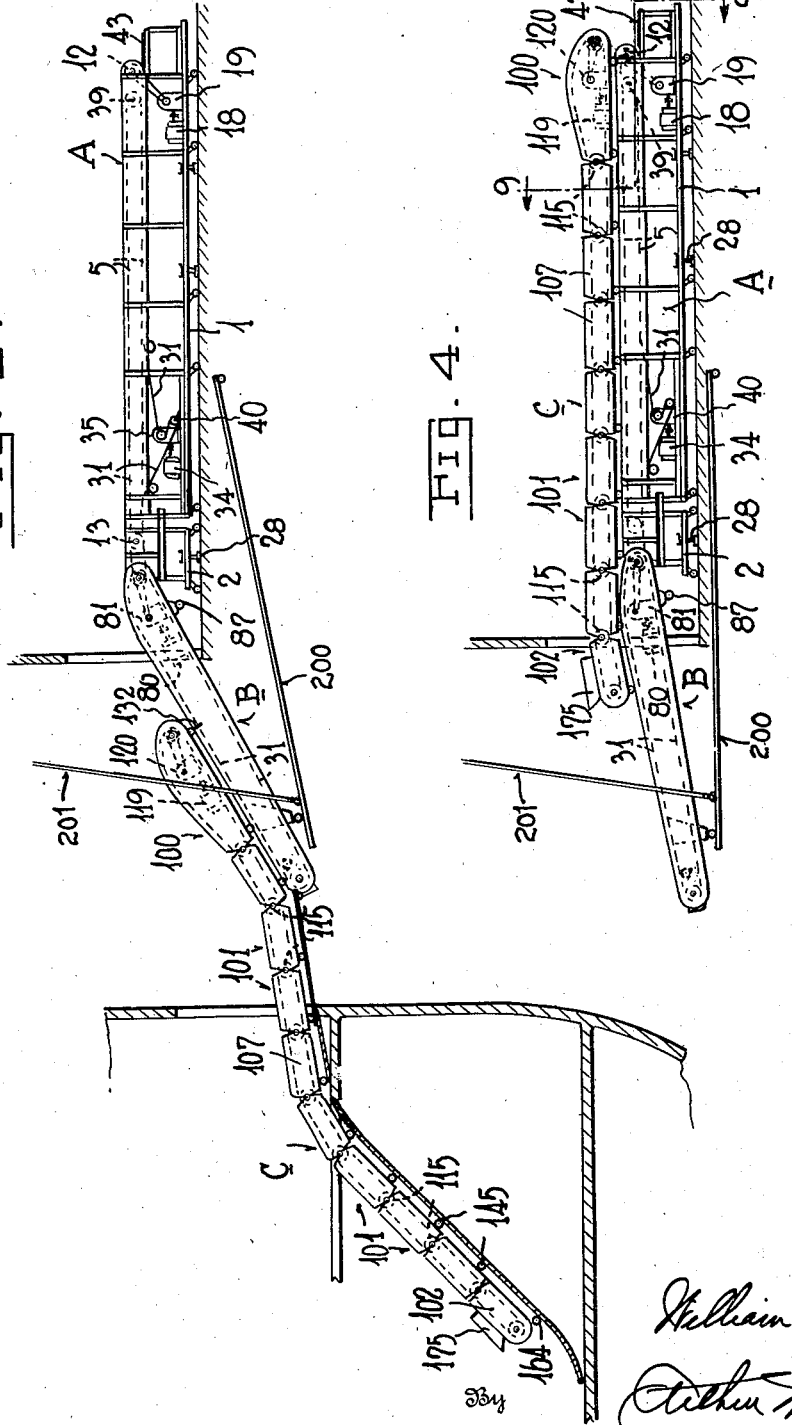

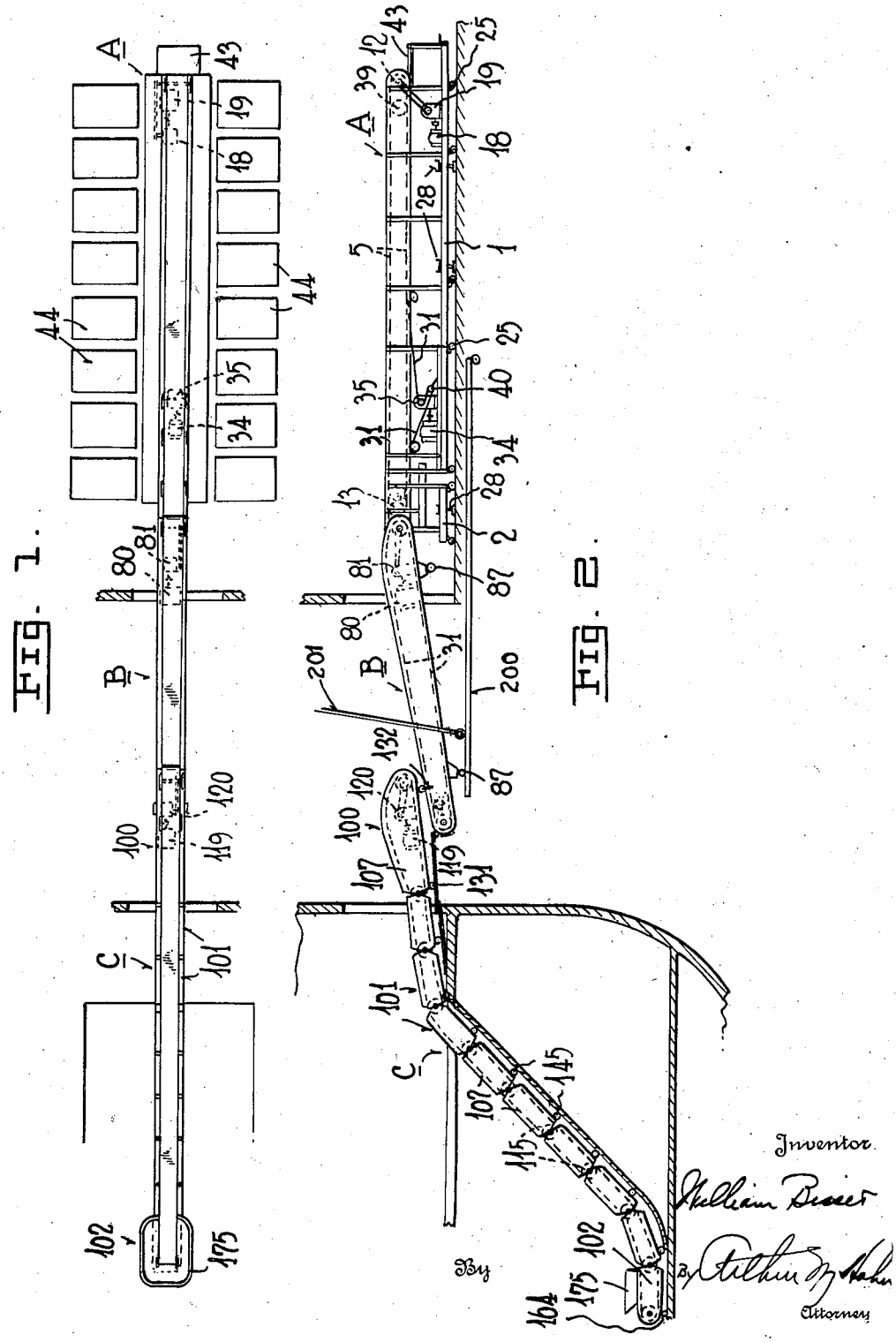

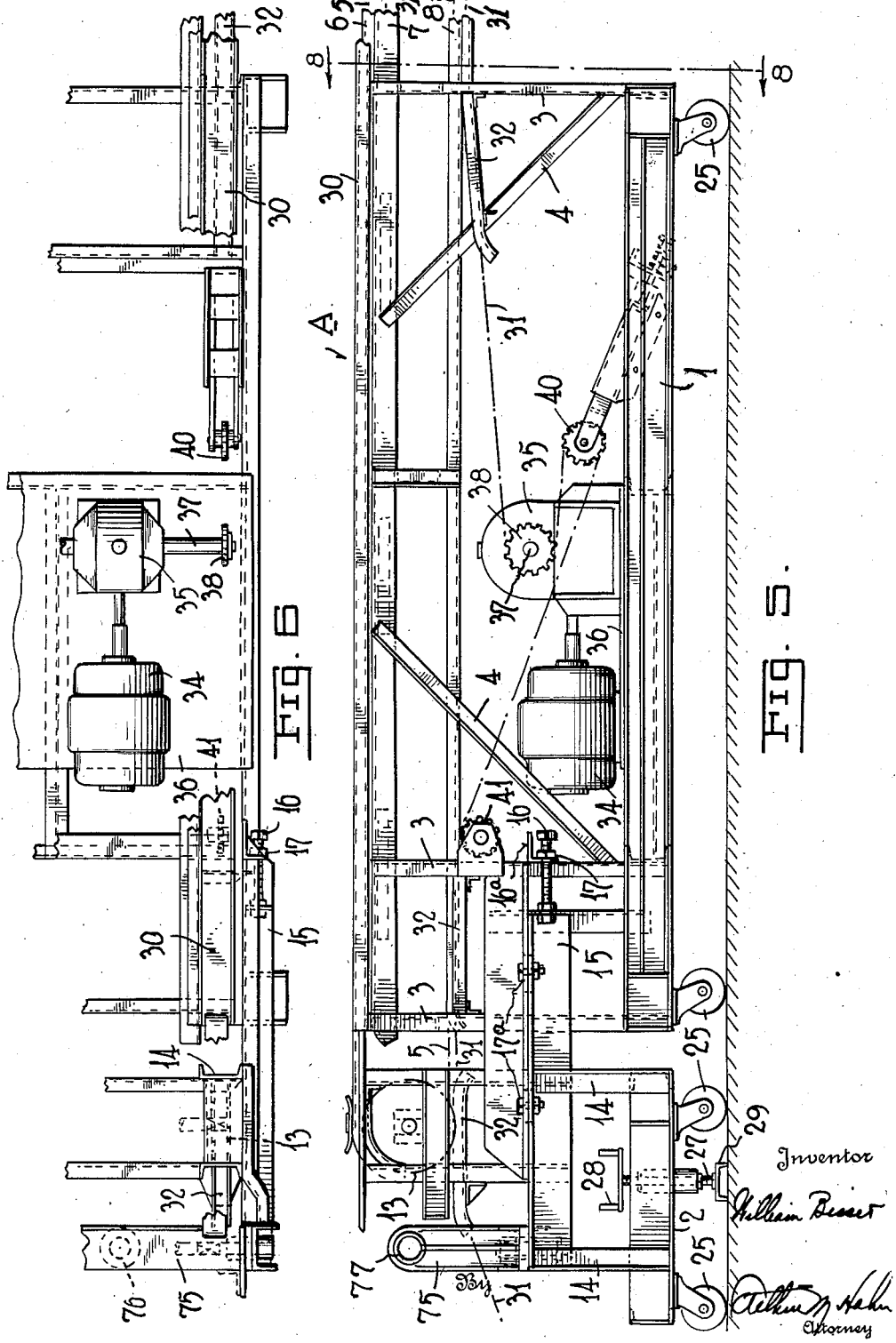

May 20, 1941.  W. BISSET  2,242,206
LOADING AND UNLOADING CONVEYER APPARATUS
Filed March 2, 1939    14 Sheets-Sheet 4
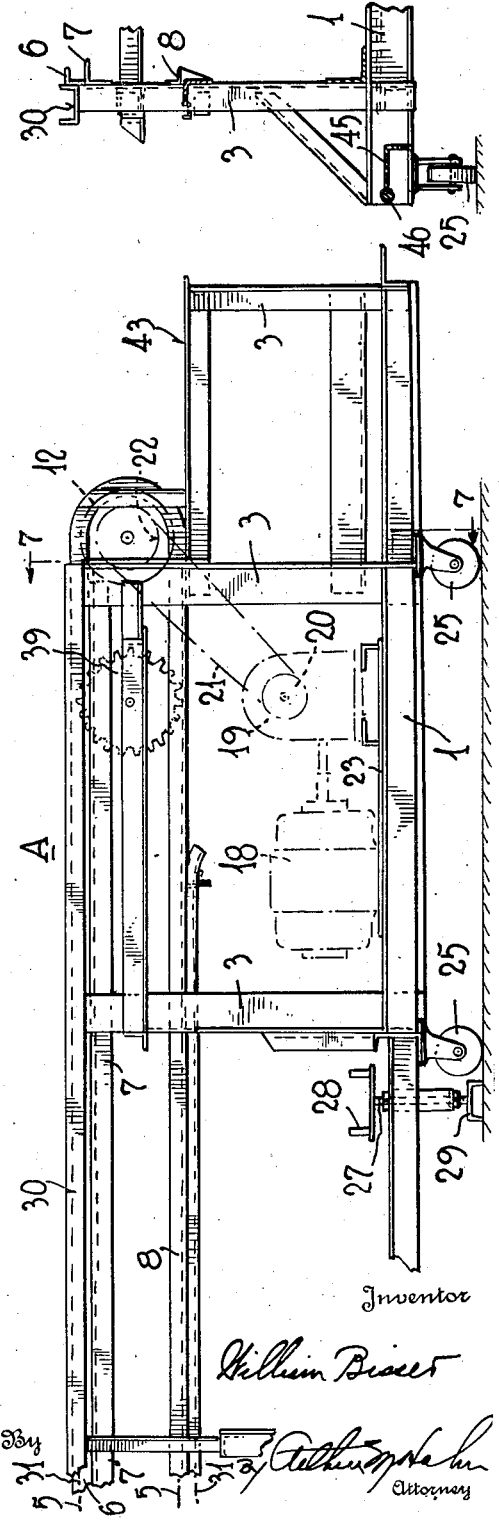
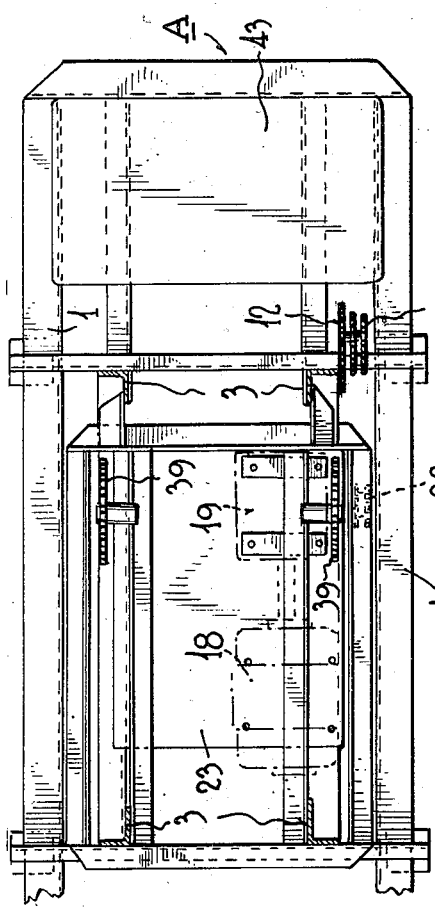

May 20, 1941. W. BISSET 2,242,206
LOADING AND UNLOADING CONVEYER APPARATUS
Filed March 2, 1939 14 Sheets-Sheet 5
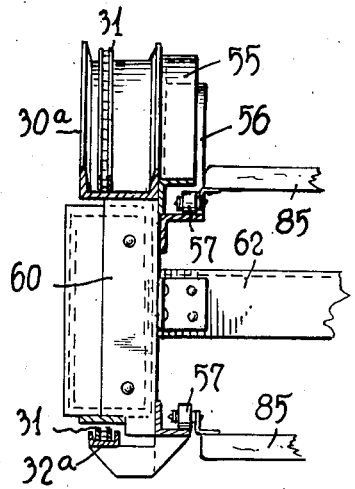
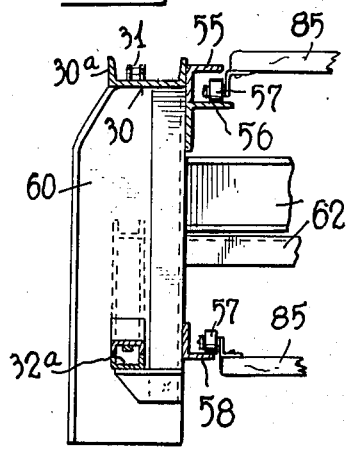
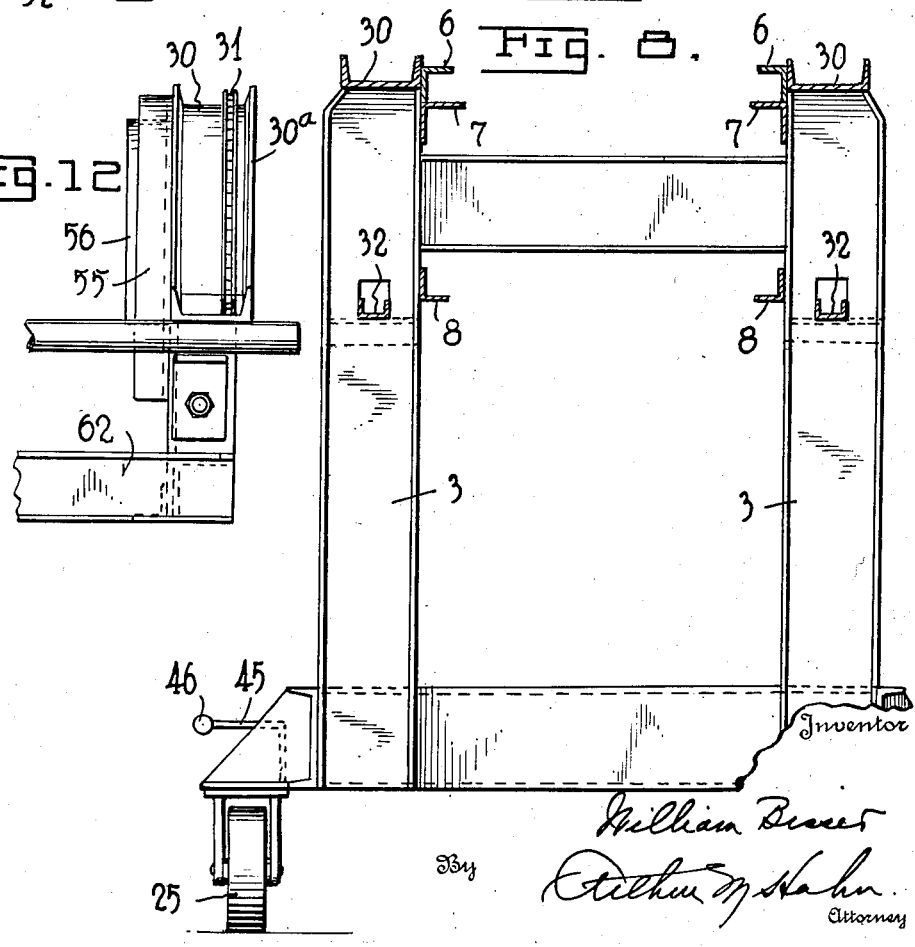

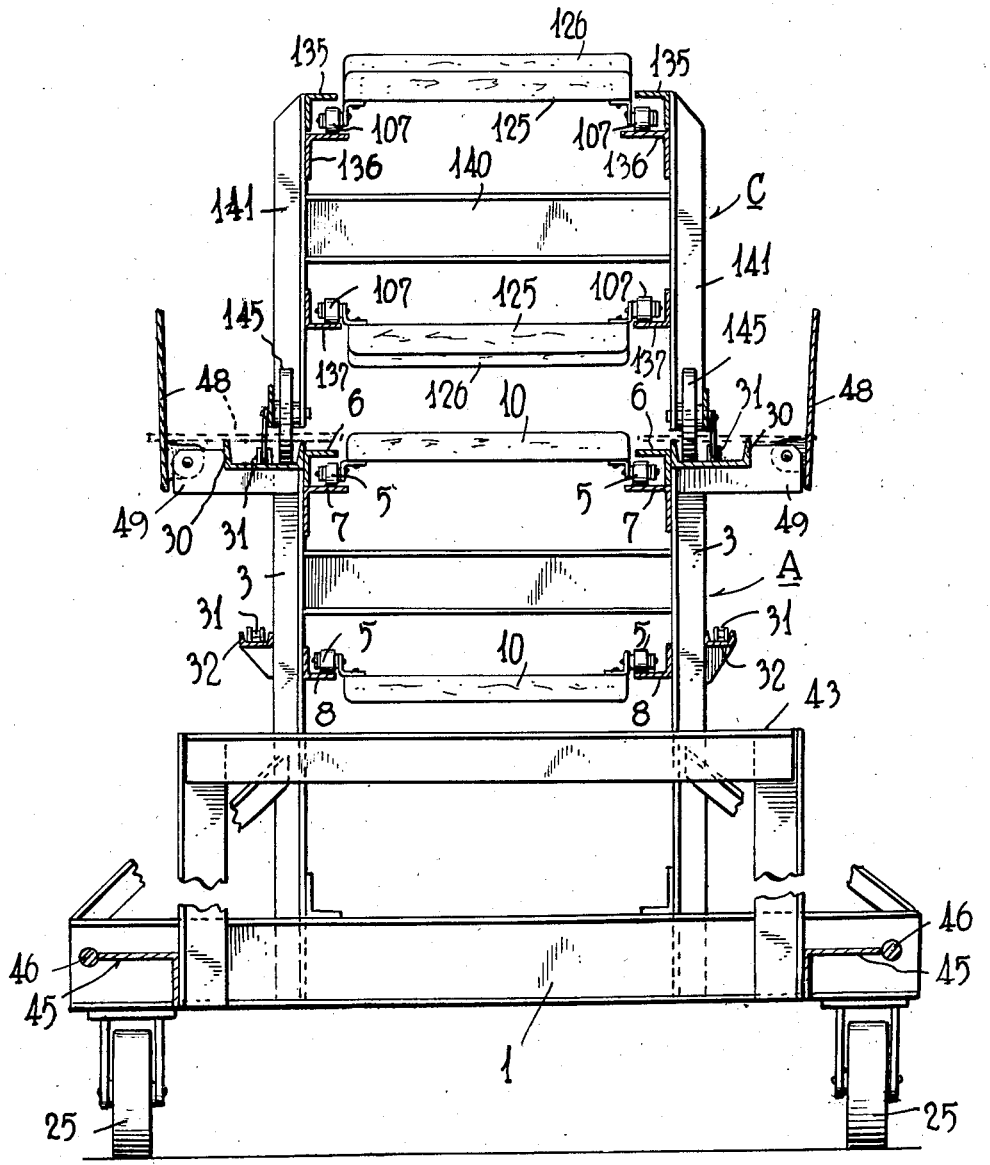

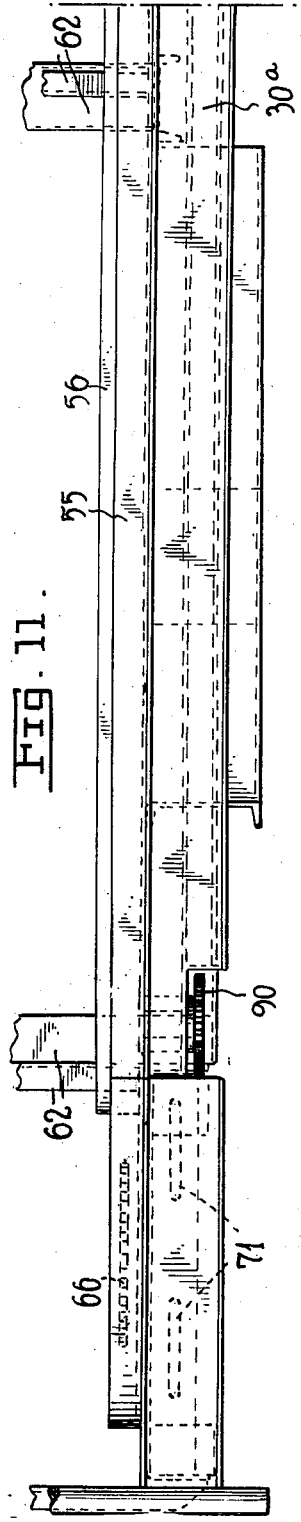
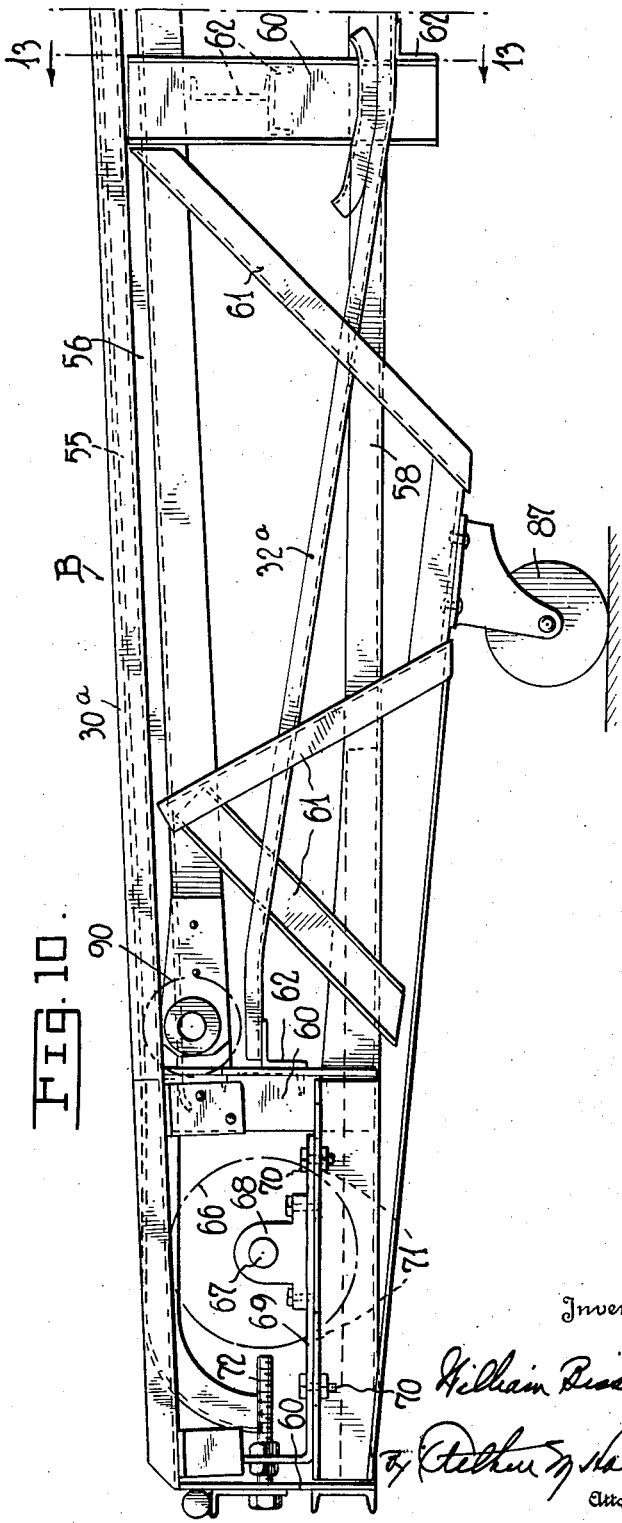

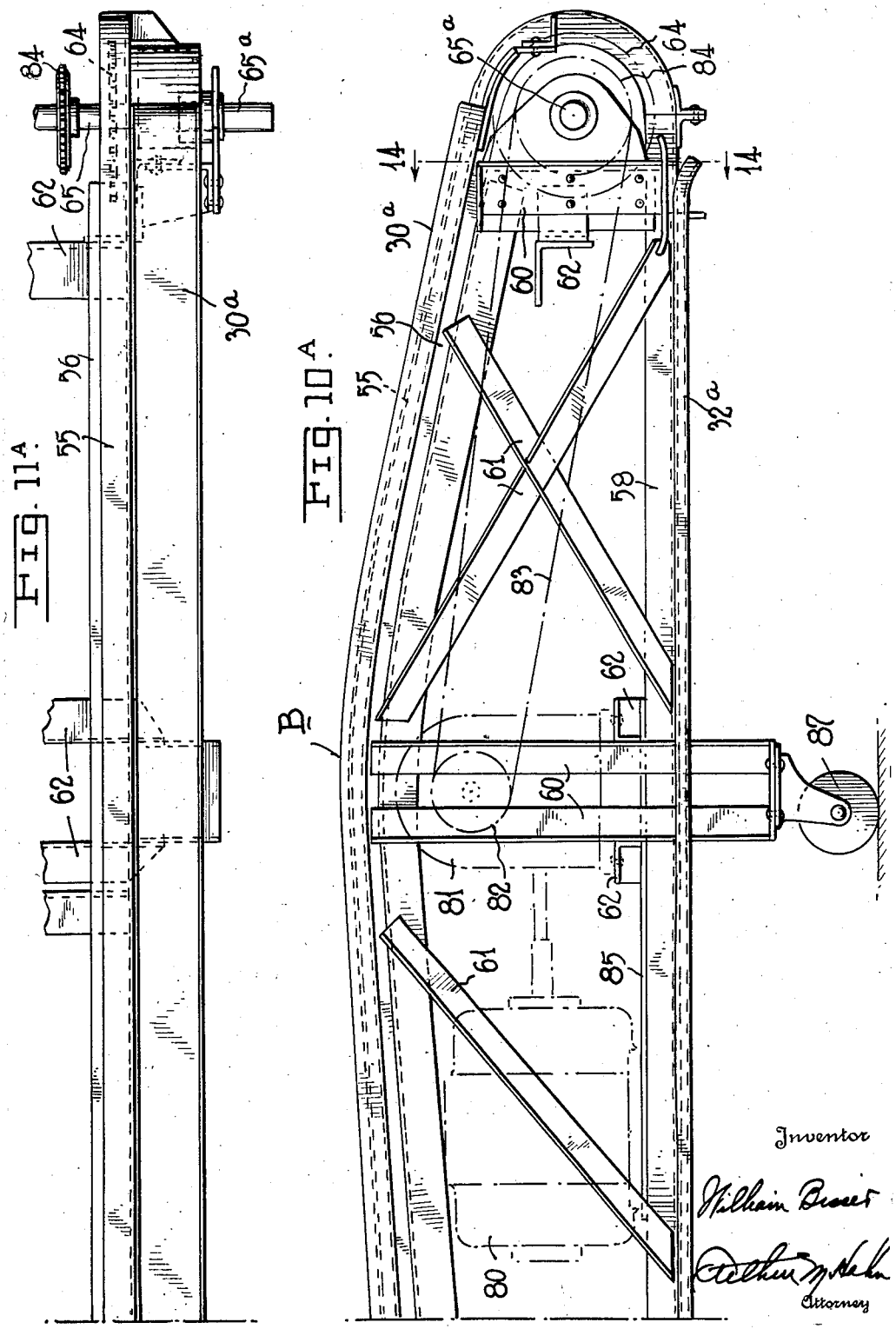

May 20, 1941.  W. BISSET  2,242,206
LOADING AND UNLOADING CONVEYER APPARATUS
Filed March 2, 1939  14 Sheets-Sheet 9
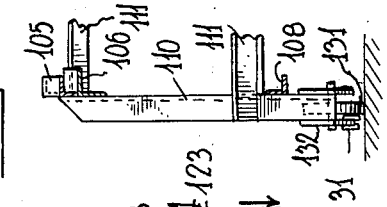
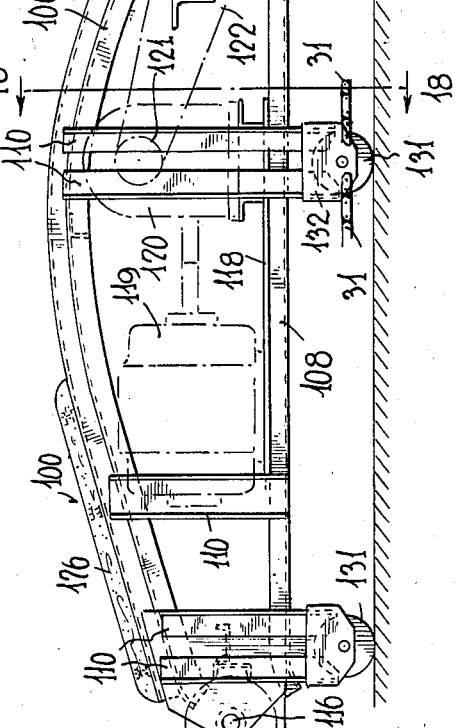
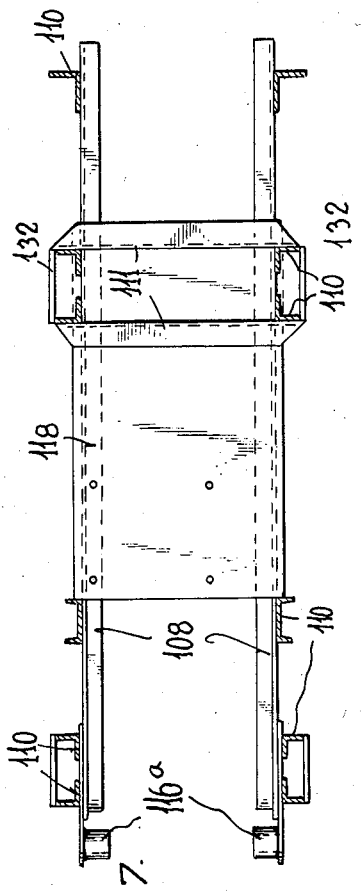
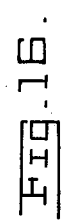
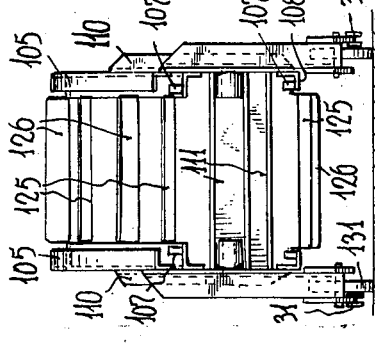

May 20, 1941.  W. BISSET  2,242,206
LOADING AND UNLOADING CONVEYER APPARATUS
Filed March 2, 1939  14 Sheets-Sheet 10
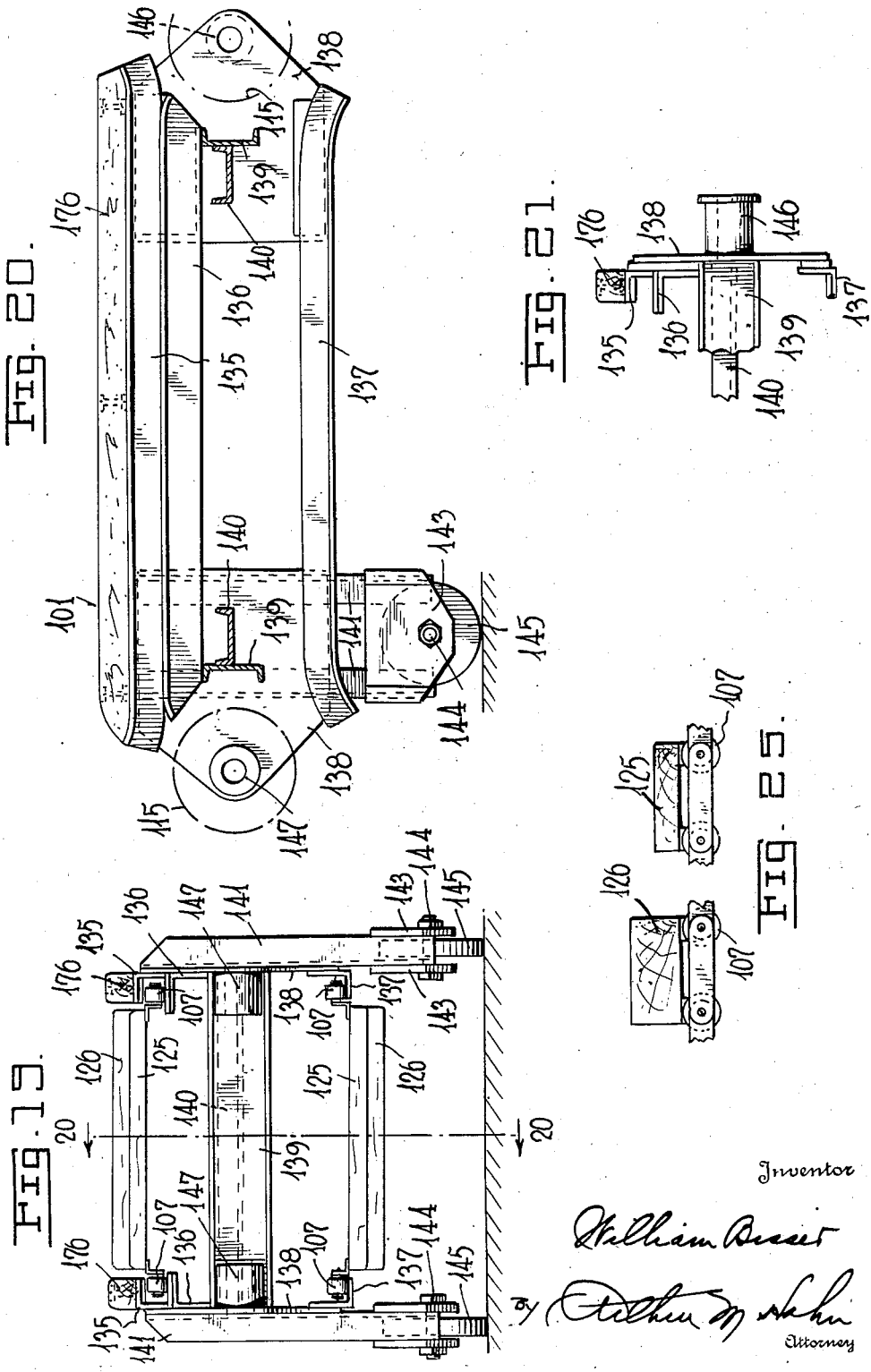

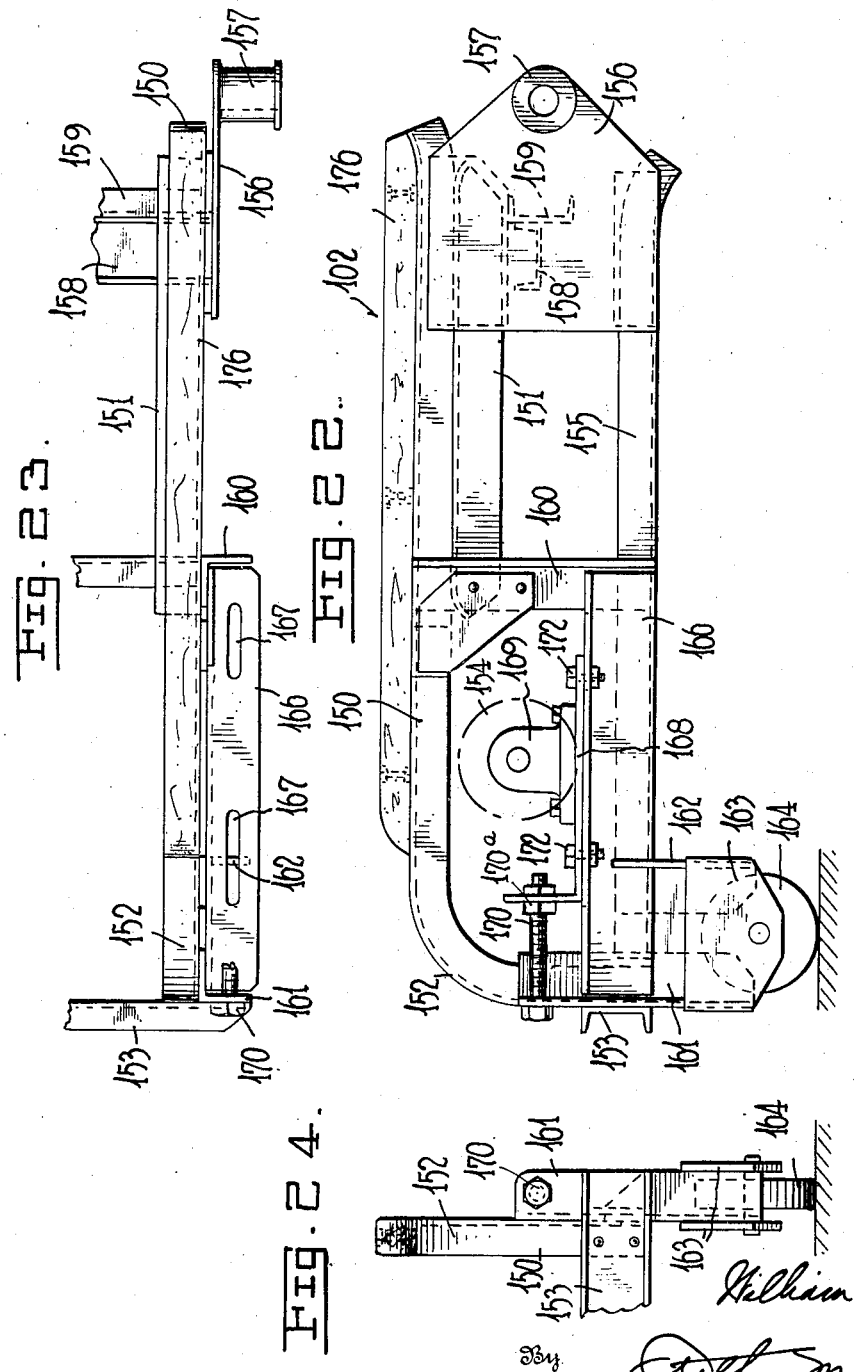

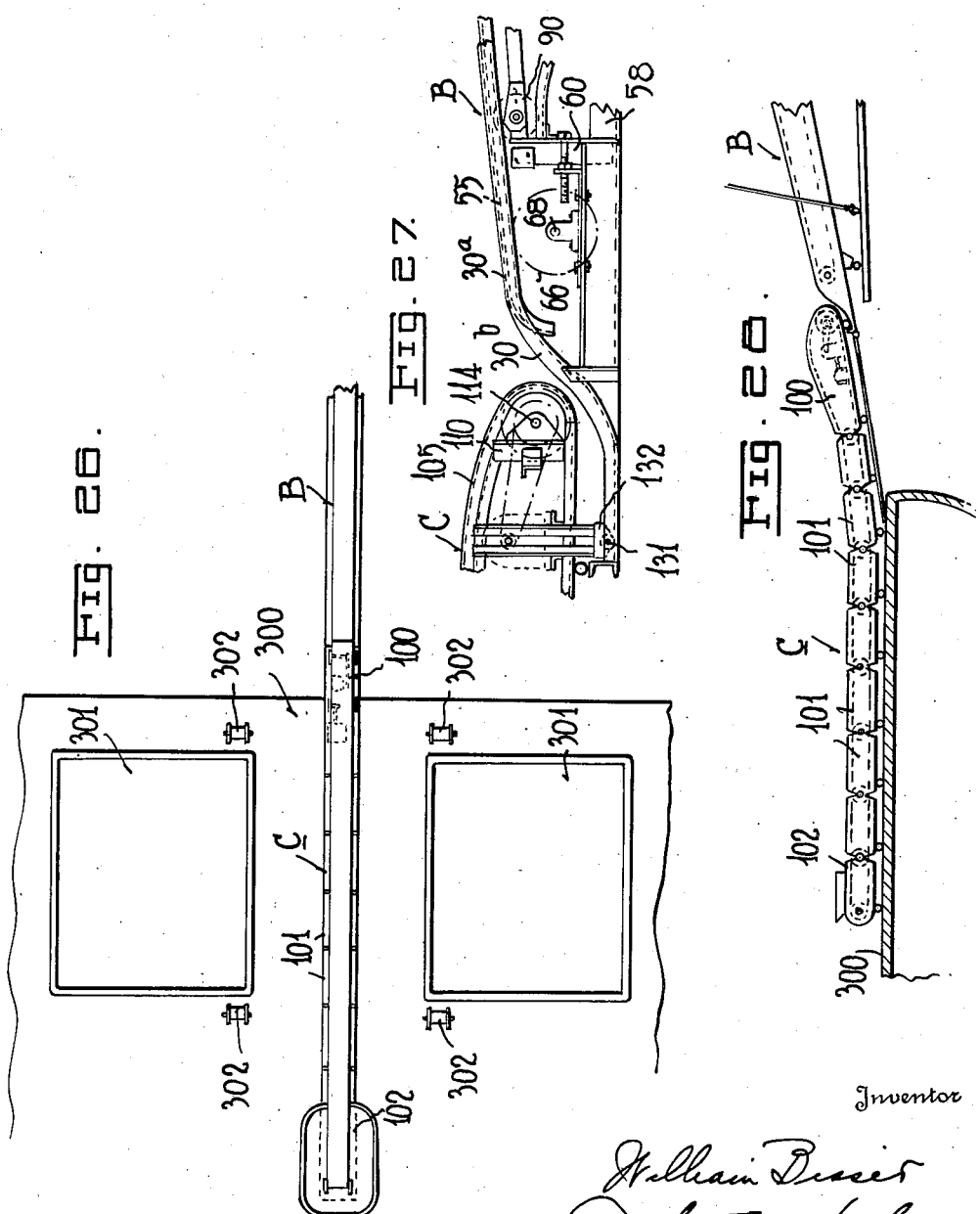

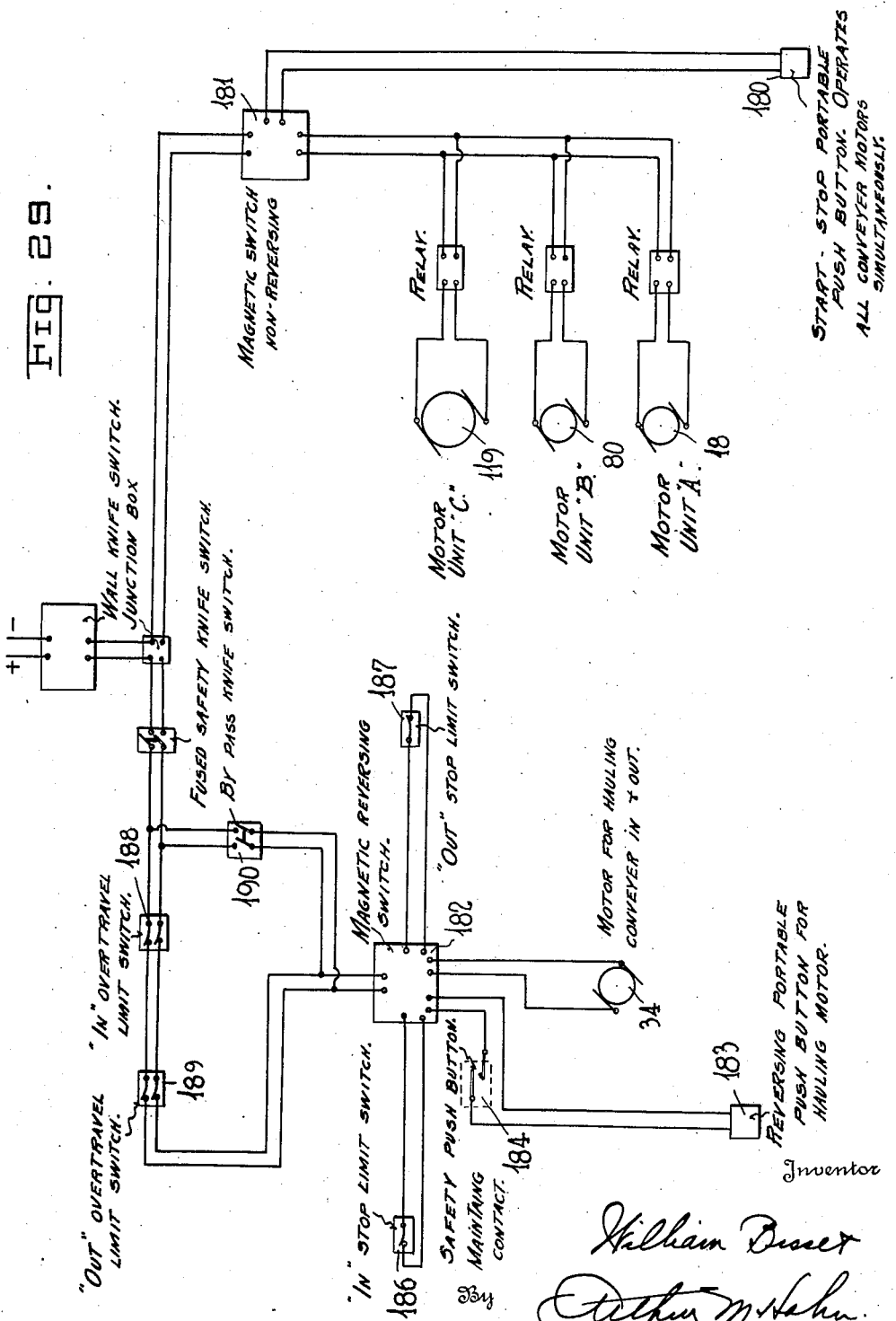

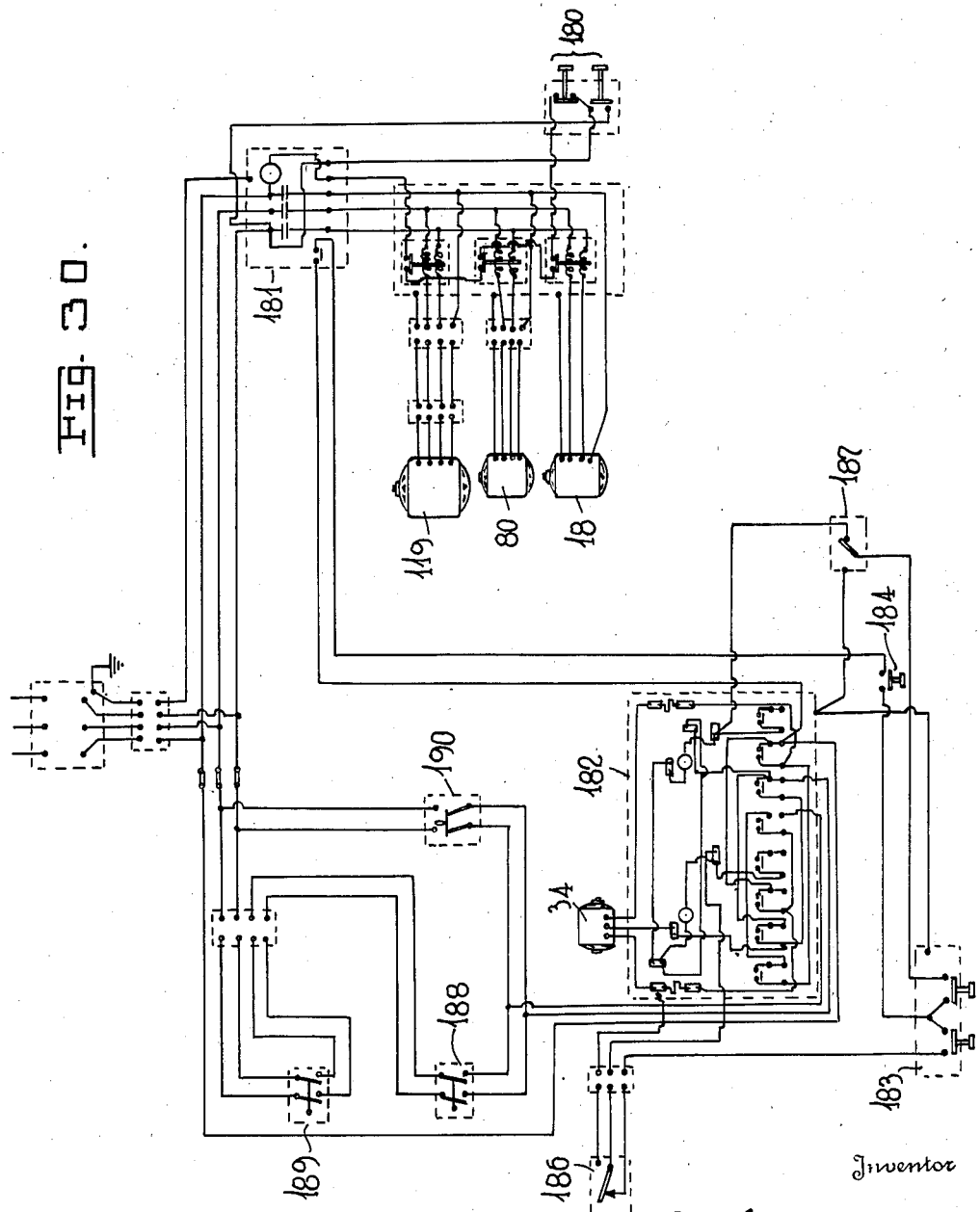

Patented May 20, 1941

2,242,206

UNITED STATES PATENT OFFICE 2,242,206

LOADING AND UNLOADING CONVEYER APPARATUS

William Bisset, Port Hope, Ontario, Canada, assignor to Mathews Conveyer Company, Limited, Port Hope, Ontario, Canada, a corporation of the Dominion of Canada Application March 2, 1939, Serial No. 259,443

21 Claims. (Cl. 198—88)

This invention relates to loading and unloading apparatus and is directed more particularly to an apparatus for loading and unloading boats at a wharf or pier.

The herein described apparatus, although capable of general application, was designed primarily for use in connection with ships that are in passenger service and which must necessarily operate on schedule. Hence the time for loading and unloading the cargo on these ships is limited to a definite number of hours. As one specific example, a certain line operating between two ports, carries regular package freight from one port to the other on one trip, while on the return trip, the cargo consists mainly of flour and grain in bags. Due to the limited time for loading, these bags of flour and grain are dumped into the hold of the ship without any attempt to classify or assort the same according to contents or trade brands, as the main object is to load as much as possible in the limited time available.

Heretofore, in the particular instance cited, the cargo limitation was in the neighborhood of 1000 tons because more than this amount could not be unloaded manually in the limited time available for the discharge of the cargo, which in this particular instance is only five hours. The capacity of each ship is up to 2000 tons, hence the boats were only operating on a 50% efficient basis with respect to the cargo carrying capacity.

With the apparatus hereinafter described, it has been found possible to load and unload the maximum cargo capacity of the vessel within the time of the normal layover so that the regular schedule is not disrupted and the vessels may be operated on an efficient cargo carrying basis.

The primary object of the present invention is to provide a loading and unloading apparatus for carriers, such as ships, which may be easily and quickly projected into or withdrawn from the hold or other cargo space of the carrier and when in operating position, shall provide a substantially continuous conveying system from the cargo hold to the storage shed.

Another object is to provide an apparatus of this character which shall consist of three interconnected and interrelated units, one unit being termed the shed unit, another the intermediate unit, and the third the flexible or snake unit. These three units are operatively related and connected in such manner that when not in use, the flexible or snake unit may be withdrawn from the cargo hold or other cargo space and positioned on top of the shed unit, and the shed unit and intermediate unit may then be moved bodily into a shed. When a ship or other carrier is to be loaded or unloaded, the apparatus may be moved bodily toward the pier or dock if necessary, so that the intermediate unit will project from the shed or warehouse. This intermediate unit is adapted to be supported on a vertically swingable platform or gangplank which is adjusted to the desired angle with respect to the ship. Suitable power driven apparatus is then operated to project the flexible or snake section, from its storage position on top of the shed section, to a position in the hold of the ship or one of the decks thereof. The three sections then form a continuous conveyer line for the transportation of the cargo. The shed section of the apparatus is provided with platforms on which operators stand and sort the various bags as they are discharged from the ship. This is accomplished by each operator pulling all bags of a certain group off the shed unit conveyer and onto suitable platform trucks, which as filled, are pulled away from the conveyer and replaced by empty trucks, the full trucks being taken to storage or to care for shipping without any further handling.

Another object is to provide an apparatus of the aforesaid character which shall be devoid of all overhead booms or cranes and which in spite of its size, may be easily handled to quickly position the same for operation or storage within the shed.

A further object is to provide a novel and highly efficient form of flexible or snake section conveyer which may be easily and quickly projected into or withdrawn from the hold or other cargo space on the ship. Such conveyer section being moved by power operated means which is under the control of two operators, one positioned adjacent to or on the ship, and the other being positioned in the shed. The control for such power operated means is preferably in the form of portable push button controls that are wired in such manner that either operator may instantly stop the projection or withdrawal of the snake section should conditions arise requiring such pause.

A still further object is to provide an apparatus of this character which may be easily and readily adjusted to different cargo levels in the ship, and which is constructed and arranged in such manner as to compensate for the rise and fall of the vessel due to tide and/or the weight of the cargo.

With the foregoing and other objects in view, the invention may be stated to consist in the various novel features of construction and arrangement or combination, all of which will be fully described hereinafter and pointed out in the appended claims.

In the drawings accompanying and forming a part of this application, I have shown an illustrative embodiment of my invention and wherein Figure 1 is a top plan view of an apparatus constructed in accordance with my invention and showing the same in position for loading or unloading a vessel;

Figure 2 is a side elevation thereof;

Figure 3 is a similar view but showing the snake or flexible conveyer section partly withdrawn from the hold of the vessel;

Figure 4 is a similar view but showing the snake or flexible conveyer section in withdrawn or storage position on the shed section of the conveyer;

Figures 5 and 5ª are jointly a view in side elevation with central portions omitted of the shed section of the apparatus;

Figures 6 and 6ª are jointly a fragmentary top plan view thereof;

Figure 7 is a fragmentary vertical sectional view taken on the line 7—7 of Figure 5ª;

Figure 8 is a vertical sectional view taken on the line 8—8 of Figure 5;

Figure 9 is an enlarged vertical sectional view taken on the line 9—9 of Figure 4;

Figures 10 and 10ª are jointly a view in side elevation of the intermediate conveyer section;

Figures 11 and 11ª are jointly a fragmentary top plan view thereof;

Figure 12 is a fragmentary end elevation of the intermediate conveyer section as viewed from the left hand end of Figure 10;

Figure 13 is a fragmentary vertical sectional view taken on the line 13—13 of Figure 10;

Figure 14 is a similar view taken on the line 14—14 of Figure 10ª;

Figure 15 is a side elevation of the upper or inner end unit of the snake or flexible conveyer section;

Figure 16 is an end view thereof as viewed from the left hand end of Figure 15;

Figure 17 is a horizontal sectional view taken on the line 17—17 of Figure 15;

Figure 18 is a fragmentary vertical sectional view taken on the line 18—18 of Figure 15;

Figure 19 is an end elevation of one of the intermediate units comprising the snake or flexible conveyer section;

Figure 20 is a longitudinal sectional view taken on the line 20—20 of Figure 19;

Figure 21 is a fragmentary end view thereof as seen from the right hand end of Figure 20;

Figure 22 is a side elevation of the lower or outer end unit of the snake or flexible conveyer section;

Figure 23 is a fragmentary top plan view thereof;

Figure 24 is a fragmentary end view as seen from the left hand end of Figure 22;

Figure 25 is a fragmentary view in side elevation of the pallet conveyer chain for the snake section;

Figure 26 is a fragmentary top plan view of the apparatus showing the snake section positioned on the deck of the ship adjacent the cargo hatches;

Figure 27 is a fragmentary vertical sectional view through a modified form of apparatus at the junction of the snake and intermediate sections, and which is so constructed and arranged that the apparatus may be used for loading and unloading a carrier;

Figure 28 is a fragmentary side elevation of the modified form of apparatus showing the snake section positioned on the deck of the vessel;

Figure 29 is a simplified wiring diagram of the electric motors and controls therefor; and Figure 30 is a more detailed wiring diagram thereof.

The complete apparatus comprises three sections, termed for convenience in description, as the shed section A, the intermediate section B, and the snake or flexible section C. The shed section remains within the shed or warehouse on the pier and this section is fitted with suitable wheels or wheels and standard rails so that it may be moved as will be explained more fully hereinafter.

The intermediate section is coupled to the shed section on horizontal and vertical pivots so that it may swing in a vertical or horizontal plane to accommodate the rise and fall or movement of the vessel due to tide and/or cargo weight. This intermediate section is also fitted with suitable wheels to permit it to move in unison with the shed section, or slightly sideways in either direction.

The snake or flexible section is movable under power longitudinally of the intermediate and shed sections of the apparatus. When not in use, the snake section rests on top of the shed section, and the entire apparatus may be rolled back into the shed or warehouse, so that the warehouse may be closed and locked. When in use, the doors of the warehouse are opened, a vertically swingable gangplank in front of the warehouse is moved to a substantially horizontal position and the entire apparatus is moved to a position where the intermediate section will rest on the gangplank and the shed section will still be in the shed or warehouse. The gangplank is then adjusted vertically to the proper angle so that the intermediate pivotally mounted conveyer section resting thereon will be at the desired angle with respect to the ship that is tied to the dock in front of the warehouse. The snake section is then moved under power from its position on the shed section, along the shed section and intermediate section and into the hold or other cargo space of the ship. As will be described in detail hereinafter, the snake section is flexible and readily conforms in curvature as it moves from a horizontal position on the shed section, to an inclined position down the intermediate section and then into the hold or other cargo space of the vessel where the lower or outer end of the snake section assumes a substantially horizontal position to serve as a loading or unloading station.

Shed or warehouse section

The shed or warehouse section of the apparatus is shown in Figures 1-9 inclusive and is designated generally by the reference character A.

This unit comprises a substantially rectangular main base frame 1 that is formed of channel iron or other suitable material, and a smaller but similar shaped auxiliary base frame 2 that is connected for movement longitudinally with respect to the main frame as will be more fully described hereinafter. Rising from the main base frame 1 at suitable intervals are a plurality of vertical angle irons 3 and diagonal truss members 4 which support a pair of vertically spaced and horizontally disposed runways for side chains 5 of the shed conveyer. The upper of these runways is conveniently formed on each side of the frame by a pair of horizontally arranged angle irons 6 and 7 as clearly shown in Figures 7 and 9, and the lower or return runway is provided by welding or otherwise securing an angle iron 8 to the vertical supports 3. The side chains 5 of the pallet conveyer are guided and supported in their upper flight by the angle irons 7 while the other angle irons 6 serve as a protective covering for the chain. The transversely spaced chains 5 are interconnected by a plurality of pallets 10 which receive and support the articles being loaded or unloaded. The chains and pallets per se are of standard construction and hence need not be described in detail.

Referring to Figures 5 and 5ª it will be seen that the inner or right hand end of the shed section is provided with suitable sprocket wheels indicated generally at 12, over which the upper run of the chains 5 pass. The return run of these chains is supported and guided by the aforementioned angle irons 8 to the outer or left hand end of the shed unit where the chains pass around suitable sprocket wheels denoted generally at 13. As shown particularly in Figure 5, it will be seen that the sprocket wheels 13 are carried by the auxiliary structure rising from base frame 2. This auxiliary structure comprises vertical supporting members 14 to which are welded suitable horizontally disposed longitudinal and transverse members, two of which are indicated at 15. These project into overlapping relation to the main frame 1 and each is operatively connected to a vertical support 3 by a threaded bolt 16 having nut 17 welded to cross member 16a. It will be obvious that bolts 16 may be rotated to vary the longitudinal displacement of the auxiliary frame with respect to the main frame and thus tighten or loosen the pallet conveyer side chains. Once adjusted, the bolts 17a may be tightened to hold the parts in adjusted position.

The drive for the pallet conveyer is preferably in the form of an electric motor indicated by dot and dash lines at 18 in Figure 5ª, although it is obvious that any other suitable prime mover may be used if desired. The motor 18 is connected through a standard reduction gear 19 to a drive sprocket 20 which in turn is connected by a sprocket chain 21 to a driven sprocket 22 that is mounted on the same shaft as sprockets 12. As shown particularly in Figures 5ª and 6ª the motor 18 and reduction gear 19 are mounted on a suitable platform 23 that is carried by the base frame 1.

The entire shed unit is mounted on swivel caster wheels 25 arranged at suitable intervals beneath the base frames 1 and 2 and it will be understood that both the main frame and the auxiliary frame move as a unit. The purpose of the swivel caster wheels 25 is to permit the entire apparatus to be moved from storage position within the shed or warehouse to an operative position with respect to the ship or other carrier as will be explained more fully hereinafter. When in operative position, the shed unit will still be in the warehouse but adjacent the front or open end toward the ship or other carrier and when so positioned, provision is made for holding the apparatus in this position. As shown particularly in Figures 5 and 5ª, the base frames 1 and 2 carry a plurality of vertically disposed screws 27, the upper end of each of which is fitted with an operating handle 28, while the lower end is connected with a suitable ground engaging member 29. It is obvious, that the handles 28 may rotate to either partially or completely lift the weight of the shed unit from the swivel caster wheels 25 and thereby anchor the unit in the desired position. After use, the handles 28 are rotated in the opposite direction to permit the apparatus to be rolled into the warehouse on swivel caster wheels 25.

The shed unit A also includes means for supporting the snake or flexible unit C on top thereof as shown in Figures 4 and 9. This means consists of relatively shallow channel members 30 that are supported, one on each side of unit A, on top of the uprights 3 and welded to the conveyer chain guide angles 6. These channels serve as a support and runway for the wheel supported snake section C and the upper run of the endless chain 31 that serves to project or withdraw the unit C from the carrier. The lower run of the chain 31 is guided and supported on the unit A by smaller channel members 32 that extend longitudinally along each side of the unit and which are also welded to the uprights 3. It will be noted that the channels 32 are not continuous but are broken adjacent the outer or left hand end of the main frame 1 as clearly shown in Figure 5. At this location, a prime mover such as an electric motor 34 and a reduction gear 35 are mounted on a suitable platform 36 extending transversely of the base frame 1. The motor is operatively connected to the reduction gear and the driven shaft 37 of the latter is fitted at each end with a sprocket wheel 38 that is engaged with the aforementioned chains 31. Each of these chains 31 is connected at one end to the snake unit C in a manner to be described hereinafter, and then extends along suitable guides on the intermediate unit B, thence along the upper channels 30 of unit A, around a sprocket wheel 39 at the inner or right hand end of unit A as shown in Figure 5ª, thence back along the lower guide channel 32 and around drive sprocket 38 of the reduction gear. From here, the chain extends over and around an angularly disposed spring urged idler take-up sprocket 40 (Figure 5), then over a fixed guide sprocket 41 that is carried by the framework, and along the lower guides 32 of unit A, then along unit B, and the other end of the chain is connected to the snake unit A as will be more fully described hereinafter. It will be understood that two of these chains 31 are used, one on each side of the apparatus for moving the snake unit in or out with respect to the shed unit A. The controls and other details of the operation of moving the snake unit will be described more fully hereinafter.

As shown in Figures 5ª and 6ª, I have illustrated a receiving table 43 at the right hand end of the shed unit A which is adapted to receive articles from the endless pallet conveyer in the event that all articles are not removed by the operators along the side thereof. In addition to this table, I also provide additional receiving means for the articles along each side of the unit A as shown in Figure 1. These additional receiving means are preferably in the form of a plurality of individual portable platform trucks 44. Referring to Figures 7, 8 and 9, it will be seen that an angle iron 45 extends longitudinally along each side of the base frame of unit A and the outer edge of the laterally projecting flange thereof is fitted with a rounded enlargement 46, The aforementioned trucks 44 are each provided at one end with a suitable coupling (not shown) of standard or approved construction which is adapted to engage over the enlargement 46 to hold the truck in operative relation to unit A. A plurality of operators, one for each truck stand with one foot on the relatively wide laterally projecting flange of angle iron 45 and the other foot on their respective truck. In this position, each operator drags a sack of a particular brand from the pallet conveyer as it passes him and swings it onto his truck. It will be noted from Figure 9, that each of the aforementioned channels 30 are covered over during operation of the apparatus by a hinged table cover plate 48 as indicated by the dotted line position. These cover plates are hinged to and supported by laterally projecting arms 49 that are welded to uprights 3 and the channels 30. The cover plates serve as a convenient rest for the sacks as the operators drag them from the moving pallet conveyer, as the cover plates provide a smooth unbroken surface in substantially the same horizontal plane as the top surfaces of the pallets 10. From the cover plates 48, it is a simple task for the operators to swing the sacks of material onto the aforementioned trucks. When each truck is loaded, it is uncoupled and replaced by an empty truck and the loaded truck is transported to any desired location such as a freight car or to a storage shed. In this manner, the particular goods are easily and quickly sorted not only according to character of goods but also as to trade brands.

Intermediate section

The intermediate section of the apparatus is indicated generally by reference character B and is illustrated in Figures 1, 2, 3, 4 and 10–14 inclusive.

This unit is pivotally connected to unit A for limited movement with respect thereto about both a horizontal and a vertical axis to compensate for movement of the snake section and ship with respect to the dock and shed unit A as will become apparent as the description proceeds.

Referring particularly to Figures 10-14 inclusive, it will be seen that the intermediate unit includes a framework comprising longitudinally disposed angle irons 55 and 56 arranged one above the other to define an upper support and guideway for the upper run of the intermediate pallet conveyer chain 57. The lower or return run of the conveyer chain is supported and guided by a reversely disposed angle iron 58. The angle irons 55, 56 and 58 are welded to vertically disposed supporting elements 60 that are arranged at longitudinally spaced intervals and form a part of the intermediate unit framework. This framework also includes appropriately placed diagonally disposed braces 61 and transversely arranged tie members 62.

The endless pallet conveyer side chains 57 pass along the aforementioned guideways and at the inner or right hand end of the unit, these chains pass around a sprocket wheel 64 that is carried by a shaft 65. At the opposite end of the conveyer section, the chains pass around similar sprocket wheels 66 which are adjustably mounted to vary the chain tension. Referring to Figure 10, it will be seen that the sprocket wheels 66 are carried by a shaft 67 that is journalled in bearing blocks 68, the latter each being mounted on a longitudinally movable support 69. Each support 69 is slidably mounted on the conveyer framework and is retained in position by bolts 70 passing through the support and through suitable slots 71 in the framework in a manner well known. One end of the support 69 is turned upwardly and a bolt and nut 72 extending between the framework and the turned up end portion serves to adjust the support longitudinally and thereby vary the tension of the pallet chains 57. When adjusted a lock nut is tightened on bolt 72 against the turned up end portion of support 69.

Referring now to Figure 5, it will be seen that the auxiliary frame 2 of the shed section A is provided with a substantially U-shaped yoke 75 at the left hand or outer end thereof. This yoke is pivotally mounted at 76 on the auxiliary frame for movement about a vertical axis. The upstanding end portions of the yoke are provided with hollow bosses 77 which engage stub shafts 65a (Figures 10a and 11a) of the intermediate section B and thus provide for movement of said section about a horizontal axis. In this manner, the intermediate conveyer section B is pivotally connected to the shed conveyer section A for movement about a horizontal and a vertical axis to compensate for corresponding movement of the ship with respect to the pier and warehouse.

The drive for the pallet conveyer of the intermediate section is illustrated in Figure 10a. A prime mover, such as electric motor 80 is operatively connected to a reduction gear 81 and these two units are mounted on a platform 85 extending transversely of the conveyer framework. In this connection, it will be noted that the prime mover and reduction gear are located within the confines of the intermediate framework in the same manner as the corresponding drive mechanism for the shed conveyer, thereby providing a compact constructional arrangement. The reduction gear mechanism 81 is provided with a driven sprocket 82 that is connected by a chain 83 with a sprocket 84. The sprocket 84 is mounted on the aforementioned shaft 65 and thus drives the sprocket wheels 64 and the conveyer pallet chains. It will be understood that the transversely spaced intermediate conveyer section chains 57 are provided with transversely disposed pallets 85 (Figures 13 and 14) similar to those described in connection with the shed section A.

The entire intermediate conveyer section B is supported on caster wheels shown at 87 so that this section may be moved in unison with the shed section A as previously described.

The intermediate section is also fitted with relatively shallow channel members 30a adjacent the upper portion of each side of the framework and these form a continuation of the corresponding channels 30 of the shed section A and form guideways for the snake section haul chains 31 and runways for the snake section when it is moved longitudinally of the sections A and B as will be more fully expained hereinafter. In a similar manner, a narrower channel 32a is fastened on each side of and adjacent the lower portion of the intermediate section framework and these runways form a continuation of guideways 32 of section A for the return runs of the haul chains 31.

Referring particularly to Figure 10, it will be seen that the outer end portion of the guideway 32a is deflected upwardly to a point adjacent a pair of transversely spaced sprocket wheels 90 that are journalled in the upper and left hand end portion of the intermediate framework. The haul chains 31 for the snake section C are engaged about these sprocket wheels.

*Snake or flexible section*

This section of the apparatus is designated generally by reference character C and is shown in detail in Figures 15-24 inclusive and in assembled relation in Figures 1-4 inclusive.

Broadly considered, the snake unit C comprises a driving head section 100 shown in detail in Figures 15-18, a plurality of intermediate sections 101 each identical in construction and one of which is shown in detail in Figures 19-21, and a receiving and/or discharging end section 102, which is shown in detail in Figures 22-24. The individual sections of this snake unit are pivotally connected together so that the unit may readily flex or bend to conform to regular and irregular curves within the limits of the apparatus as clearly shown in Figures 1-4, when it is projected into or withdrawn from the carrier.

The power head section designated generally as 100 comprises a suitable framework which includes longitudinally disposed angle irons 105 and 106 arranged one above the other to form a support and guideway for the side chains 107. These transversely spaced guideways are arched as shown in Figure 15 to provide space for the pallet conveyer drive mechanism to be described hereinafter. A lower reversely disposed and longitudinally extending angle iron 108 is arranged on each side of the section to provide a support and guideway for each return run of the conveyor chain. The angle irons 105, 106 and 108 are welded to vertically disposed supporting members 110, and suitable transversely extending members 111 serve to brace and tie the framework together.

At the inner or right hand end of the section 100, a pair of transversely spaced sprocket wheels 113 are mounted on a shaft 114, and each of these sprockets is aligned longitudinally with its respective pallet chain guideways. At the opposite end of section 100, a similar but smaller pair of idler wheels 115 are journalled on bosses 116a (Figure 17) of the framework. These bosses are hollow and receive a shaft 116 which serves to pivotally connect the power head section with the adjacent intermediate section 101. The idler wheels 115 merely serve as guides for the pallet conveyer chains 107 as these chains extend the entire length of the snake unit and pass tangentially over the periphery of the wheels 115. When one or more sections of the snake unit are disposed at an angle to the adjacent sections, these wheels 115 will guide the chains 107 from one section to the other.

The power head section is provided with a platform 118 that is fastened between the lower angle iron guides 108 and this platform has mounted thereon a prime mover such as an electric motor 119 and a reduction gear 120. The motor is operatively connected with the reduction gear and said reduction gear is provided with the usual extended driven shaft which carries a sprocket wheel 121. This sprocket wheel 121 is connected by a chain 122 that also passes around a sprocket wheel 123 on shaft 114. In this manner, power is transmitted from the electric motor 119 to the pallet conveyer chains to drive the same.

As shown in Figures 16, 19 and 25, the pallet chains 107 are interconnected by a plurality of wooden pallets 125 and 126. The pallets 125 are of less height than those denoted by reference character 126 and as shown in Figure 25, these pallets are alternately arranged along the conveyer chain 107. The purpose of this arrangement is to provide pockets or depressions along the conveyer so that articles such as sacks of grain or flour will not tend to slide backward by gravity on the conveyer section C as they are conveyed from the carrier to the intermediate section B.

The power head section 100 is provided with wheels 131 adjacent each end thereof which movably support this section. As shown in Figure 15, the ends of each of the haul chains 31 for moving the snake section in or out with respect to the units A and B, are fastened to a plate 132 adjacent the inner end supporting wheels 131.

A plurality of intermediate sections 101 are pivotally connected to each other and these are pivotally connected at one end to the power head section 100 as previously described, and at the other end to the receiving and/or discharging section 102 as illustrated in Figures 1-4.

Each of the intermediate sections 101 are identical in construction, hence a description of the one illustrated in detail in Figures 19-21 will suffice for all. The framework of each section 101 comprises longitudinally disposed angle irons 135 and 136 arranged one above the other to form a support and guideway for the upper run of the pallet conveyer chain 107. A reversely disposed and longitudinally extending angle iron 137 is arranged, one on each side of the framework, to provide a support and guideway for the lower or return run of the pallet conveyer chain 107. The angle irons 135, 136 and 137 are welded to vertically disposed end plates 138 and to transversely extending tie channels 139. Additional transverse tie channels 140 are welded to the channels 139 and to end plates 138 to impart strength and rigidity to the section. Adjacent one end of each section, a pair of spaced vertically disposed angle irons 141 are welded to the end plate 138 on each side of the framework. These angle irons extend below the return run guide angles 137 and adjacent their lower ends, a plate 143 is welded on each side thereof to provide supports for an axle 144. A wheel 145 is carried by each axle to movably support the section. It will be noted that the plates 138 at one end of the section are formed with bearing bosses 146 on the outer surfaces, while at the opposite end, the bearing bosses 147 are provided on the inner surfaces. Thus, when two adjacent intermediate sections 101 are pivotally connected together, the end plates of one section with the bosses 146 on the outer surfaces will overlap the plates on the adjacent section having the bosses 147 on the inner surfaces, and all four of the bosses will be in transverse alignment. A shaft (not shown) extends through the bearing bosses and this shaft serves as the pivotal connection between sections. Idler wheels 115, similar to those aforementioned, are journalled on the bosses of each section to guide the pallet conveyer chains 107.

The extreme outer or left hand end of the snake unit is fitted with the receiving and/or discharging section 102 shown in detail in Figures 22-24. The framework of this section includes longitudinally disposed angle irons 150 and 151 arranged one above the other to form a support and guideway for the upper run of the pallet conveyer chain 107 as heretofore described in connection with sections 100 and 101.

In the case of the section 102, however, each of the upper angle irons 150 is curved downwardly at the outer end portion thereof as indicated at 152, and fastened to a transverse tie channel 153. The angle irons 151 each terminate adjacent a sprocket wheel 154 about which the pallet chains 107 move, and which will be referred to hereinafter. Reversely disposed angle irons 155, one on each side of the framework serve to support and guide the return run of the pallet conveyer chain 107.

The inner or right hand end of the section 102 has a plate 156 welded to the angle irons 150, 151 and 155 and these plates are each provided with a bearing boss 157 to pivotally connect the section to the adjacent intermediate section 101 as previously described in connection with adjacent intermediate sections. Suitably arranged transverse tie channels 158 and 159 serve to strengthen and impart rigidity to this end portion of the section. The framework is further strengthened by vertical angle irons 160 which interconnect the upper and lower angle iron guides for the conveyer chain. At the outer or left hand end of the framework, vertical angle irons 161 each project below the return run guideway 155. A shorter but similar angle iron 162 also projects below the guideway 155, and these angle irons are fitted with bearing plates 163 in which wheels 164 are journalled.

A longitudinally disposed angle iron 166 is fastened along each side of the section adjacent the outer or left hand end thereof. The top outwardly projecting flange of each of these angle irons is slotted as shown at 167 and serves as a support for a plate 168 on which a bearing block 169 is mounted. One end of the plate 168 is turned upwardly and a bolt 170 is engaged through the flange of angle iron 161 and the upturned portion of plate 168. The bolts are fitted with nuts to provide the usual adjustment of the bearing blocks and the conveyer chains. When adjusted, the parts are held in position by tightening a lock nut 170a on adjusting bolt 170.

The receiving and/or discharging section 102 may be provided with an upwardly extending hopper 175 as indicated in Figures 1–4 if desired. The purpose of this hopper is to expedite the loading of grain and flour sacks on the snake section when the apparatus is used for unloading vessels.

In order to prevent chafing of the sacks as they are carried upwardly on the conveyer, the top guide angles of the several sections may be fitted with rails 176 formed of wood or other suitable material.

Electrical control system

The electrical control of the entire apparatus is illustrated in Figures 29 and 30. Figure 29 is a simplified wiring diagram of the controls while Figure 30 is in greater detail.

The motors for driving the conveyers of the shed section A, the intermediate section B and the snake section C are clearly indicated by their respective reference characters, and also the motor for hauling the snake section in and out. It will be noted that a portable push button 180 is in circuit with the three conveyer motors so that these three motors may be started and stopped simultaneously, thereby providing a master control for the operation of the pallet conveyers. This push button is connected in the motor circuit through a non-reversing magnetic control switch 181. It will also be noted that this switch is interlocked with a magnetic reversing switch 182 which controls the operation of motor 34 for hauling the snake section "in" and "out". This arrangement prevents starting the haul motor 34 while three conveyer motors 18, 80 and 119 are running and prevents starting the conveyer motors when the haul motor is running.

The operation of the haul motor 34 is manually controlled by two push buttons 183 and 184. Push button 183 is capable of operating the haul motor 34 in either direction while push button 184 is of the "maintaining circuit" type. That is, push button 184 is in series circuit with push button 183 so that it must be held in contact engaging position to complete the electrical circuit to push button 183. These two portable push buttons are preferably arranged so that the operator of push button 183 may stand at any convenient location on the ship or gangway where he can watch the outer end of the snake section C. The other operator of push button 184 stands in the shed or warehouse where he can see that everything is clear therein. When the snake section is to be moved "in" or "out," it is necessary for both operators to hold their respective push buttons in contact engaging position. Should either operator desire to stop the movement of the snake section he may do so instantly by releasing his push button. This arrangement provides a safety control for the movement of the snake section.

As an additional safety measure, the apparatus is provided with two limit switches 186 and 187. Limit switch 186 is located on the shed section A in a position where it will be engaged by an abutment on the snake section when the apparatus is in "storage" position as shown in Figure 4. The other limit switch 187 is located on the intermediate section B adjacent the outer end thereof and is adapted to be engaged by an abutment on the snake section when it reaches substantially its maximum extended position. Normally, the operators are supposed to stop the movement of the snake section before either of these limit switches is actuated. If, however, either operator should fail to stop the movement of the snake section, the circuit to motor 34 would be automatically opened by these limit switches and thus prevent damage to the apparatus.

As a still further safety measure in preventing over travel of the snake unit should either of the limit switches 186 and 187 fail to function, a second pair of limit switches 188 and 189 are connected in the electrical circuit controlling the haul motor 34. Switch 188 is located a few inches beyond the limit switch 186 and switch 189 a few inches beyond 187.

It will be noted from the wiring diagram that the limit switches 186 and 187 are connected in the magnetic reversing switch control circuit and hence function automatically for the push buttons 183 and 184, whereas the limit switches 188 and 189 are connected in the main line to the magnetic reversing switch and hence open the main current line if actuated. If the limit switches 188 and 189 should be actuated by any reason, the push button controls 183 and 184 would be "dead," as the main line circuit would be broken and it would be impossible to move the snake section until the limit switches 188 and 189 were reset. In order to avoid this difficulty, there is provided a by-pass circuit which is controlled by a manually operated knife switch 190. Normally this switch is open. Should the aforementioned main line limit switches 188 and 189 be actuated, the knife switch 190 can be closed to temporarily by-pass these limit switches, and the snake section can then be moved by the push button control.

It is believed that a further detailed description of the wiring of the several circuits is unnecessary as the remaining parts in the circuit are of standard construction and are connected in accordance with standard practice. In the simplified wiring diagram in Figure 29, a two wire main line is illustrated for simplicity, while in actual practice, a four wire system is used for the heavy current required and this is illustrated in detail in Figure 30.

In Figures 26-28, I have illustrated a slight modification of my invention with respect to the positioning of the snake unit in the vessel or carrier and also with respect to the connection between the snake and intermediate units whereby the apparatus may be used equally well for loading and unloading a carrier.

Referring particularly to Figure 27, it will be seen that the shallow channel members 39a, which serve as the guideway for the wheels of the snake unit during its travel "in" and "out" over the intermediate unit, are extended downwardly and beyond the main framework of this unit as indicated at 39b. With this arrangement, the snake unit C can be projected from unit B in such manner that the top of the snake unit will more nearly approach alignment with the top of the intermediate unit B, hence the apparatus may also be used for loading material on the carrier from the dock or warehouse by reversing the direction of travel of the conveyers on the several units. In other respects, the apparatus is similar to that previously described.

In Figures 26 and 28, I have illustrated the snake section C as positioned on a deck of the vessel or carrier. In some instances, it is desirable to project the snake unit C onto a deck 300 of the vessel between the cargo hatches 301. The cargo is then hoisted from the cargo space in any suitable manner, as by winches 302, and dumped either on deck where it may be manually placed on the unit C, or it may be dumped directly onto the unit C.

While I have shown the modified form of structure in Figures 26 and 28, it will be obvious that the apparatus shown in Figures 1-25 could also be used in this particular manner.

Operation

It is assumed that the apparatus is in storage position, that is with the snake section C positioned on top of the shed section A, and all three sections A, B and C, have been pushed back into the shed or warehouse. Upon the arrival of a ship at the dock in front of the warehouse, the doors of the warehouse will be opened, and the gangplank 200 will be elevated by cables 201 to a substantially horizontal position as shown in Figure 4. The entire apparatus will then be wheeled or pushed toward the front of the warehouse so that the intermediate section B extends through the opened doors and is supported on the gangplank as clearly shown in Figure 4. The cables 201 are then slacked off to permit the gangplank to assume an inclined position and align the intermediate section with the opening in the ship as clearly shown in Figure 3. In the event that the tide or load in the vessel is such that the gangplank 200 need not be adjusted, it will be understood that this step of positioning the gangplank may be omitted as shown in Figure 2. In any event, when the intermediate section B of the apparatus is substantially in alignment with the cargo opening in the vessel, one of the operators boards the vessel or stands in such position adjacent the vessel that he may observe the projection of the snake section into the hold of the ship. Another operator stands in the warehouse in a position to observe the shed section of the apparatus. As has been previously described, the first operator is provided with a push button 183 and the second operator with a push button 184, these push buttons being electrically connected in such manner that either operator may instantly stop the operation of the haul motor 34.

When everything is in readiness, both operators depress their push buttons which serves to energize the haul motor circuit and the snake section C is moved bodily from its position on top of shed section A, in a forward direction over intermediate section B and down into the hold or other cargo space of the vessel. The snake section is moved outwardly until the outer end thereof is positioned on the floor of the cargo space of the vessel as clearly shown in Figures 1, 2, 26 and 28. During this outward movement of the snake section, it will be free to conform to the contour of the inclined support between the deck and/or the bottom of the hold of the vessel, by reason of the snake section comprising a plurality of articulated units. It will be understood, that the snake section may be projected to its maximum position where the rear end of the snake section 100 will be resting on the outer end portion of the intermediate section B, or the snake section may be halted at any intermediate point so that the inner end thereof will be resting on any other portion of the intermediate section B. During this movement of the snake section, either operator may instantly stop movement thereof by releasing his push button, thus avoiding any damage to the apparatus which might happen if it was necessary to signal or otherwise communicate with a single operator. The operator on board or adjacent to the ship cannot only stop the movement of the snake section, but also can reverse the direction of travel thereof so that he is enabled to position the outer end of the snake section in a suitable article receiving position.

Should either of the operators fail to stop the snake section at its outermost or innermost position of travel, the aforementioned limit switches 186 and 187 will be automatically actuated by the snake section to stop movement thereof. In the event that either of these switches should fail, the second set of overtravel limit switches 188 and 189 will accomplish the same result automatically as has been described in detail above.

With the snake section in position on the ship, the motors 18, 89 and 119 on the respective sections A, B and C are energized to drive the conveyers on these sections. The cargo to be unloaded is then dumped onto the snake section, and if desired, the hopper 175 may be used to facilitate positioning of the cargo onto the receiving end of the snake section. The individual conveyers on the three units operate continuously so that the sacks of flour and grain or other cargo will be started in motion up the inclined snake section as soon as they are dumped onto this section. By reason of the high and low type pallets on the snake section, the bags of grain will be pocketed thereon and prevented from sliding backwards as the snake section conveyer elevates them from the hold or other cargo space of the ship. When the articles reach the inner end of the snake section, they are automatically discharged onto the intermediate section B, and likewise, this section discharges the articles onto the shed section A.

As has been previously described, a plurality of operators are grouped about the shed section A each with one foot on the platform 45 and the other foot on a portable platform truck 44. Each operator will be assigned a particular brand or type of article being discharged from the ship. As these assigned articles pass the operator, he reaches over and drags the articles from the conveyer of the shed section onto the adjacent stationary table 48 and then swings them onto the portable truck 44. In this manner, the group of operators will automatically sort the articles being discharged onto the several platform trucks 44 that are temporarily anchored to the shed section as previously described. When each truck is filled, another operator will disconnect it from the shed section and haul it to a suitable point in the warehouse or to a train on which it is to be loaded, meanwhile replacing the filled truck with an empty platform truck. Any articles not removed by the operators at the sides, are carried rearwardly and dumped on the rear table 43.

When the hold of the ship has been unloaded or an intermediate deck has been unloaded, the aforementioned operators who control the movement of the snake section energize the haul motor 34 to withdraw the snake section from the emptied hold of the ship or other storage space and position it in the next cargo space to be unloaded. After the ship has been entirely unloaded, the operators actuate their push buttons to withdraw the snake section from the ship and back onto the shed section A of the apparatus. The entire apparatus is then moved into the warehouse to storage position.

While the operation of the device has been described in connection with the unloading of a ship, it is obvious that the apparatus could be operated in a reverse manner to load a ship or other carrier as described in connection with Figure 27. In this case, the cargo would be first positioned on the shed section A and the conveyers of the respective sections A, B and C would be operated in a reverse direction to transport the cargo from the shed section to the hold or other cargo space of the vessel.

What I claim is:

1. An apparatus of the character set forth including a conveyer unit comprising two sections pivotally connected together so that one section may be disposed at an angle relative to the other section, each of said sections having longitudinally disposed guideways thereon, a second conveyer unit movable over said guideways, and means for moving said second conveyer unit with respect to the first conveyer unit whereby said second unit may be positioned over the first unit or projected longitudinally thereof to form a continuous conveyer of both units.

2. An apparatus of the character set forth including a conveyer unit comprising two sections pivotally connected together so that one section may be disposed at an angle relative to the other section, each of said sections having longitudinally disposed guideways thereon, a second conveyer unit movable over said guideways, the side frames of said second conveyer including a plurality of sections pivotally connected together to permit said conveyer to conform to curved surfaces, and power operated means for moving said second conveyer unit with respect to the first conveyer unit whereby said second unit may be positioned over the first unit or projected longitudinally thereof to form a continuous conveyer of both units.

3. An apparatus of the character set forth including a conveyer unit comprising two sections pivotally connected together so that one section may be disposed at an angle relative to the other section, each of said sections having longitudinally disposed guideways thereon, a second conveyer unit movable over said guideways, power operated means for moving said second conveyer unit with respect to the first conveyer unit whereby said second unit may be positioned over the first unit or projected longitudinally thereof to form a continuous conveyer of both units, and portable manually actuated means for controlling the operation of said power operated means.

4. An apparatus of the character set forth including a conveyer unit comprising two sections pivotally connected together so that one section may be disposed at an angle relative to the other section, each of said sections having longitudinally disposed guideways thereon, a second conveyer unit movable over said guideways, a prime mover carried by one of said units for moving said second conveyer unit with respect to the first, and mechanism operatively connecting said prime mover with the other conveyer unit whereby actuation of said prime mover will serve to position said second unit over the first or project the same longitudinally thereof to form a continuous conveyer of both units.

5. An apparatus of the character set forth including a conveyer unit comprising two sections pivotally connected together so that one section may be disposed at an angle relative to the other section, each of said sections having longitudinally disposed guideways thereon, a second conveyer unit movable longitudinally over said guideways, a prime mover carried by one of said units for moving said second conveyer unit with respect to the first, mechanism operatively connecting said prime mover with the other conveyer unit whereby actuation of said prime mover will serve to position said second unit over the first or project the same longitudinally thereof to form a continuous conveyer of both units, and portable manually actuated means for controlling the operation of said prime mover.

6. An apparatus of the character set forth comprising three conveyer units, two of said units being pivotally connected end to end and movable about said pivot with respect to each other, the third unit being movable longitudinally of the first two mentioned units whereby said third unit may be positioned over said first two units or projected longitudinally thereof to form a continuous conveyer of all three units and means extending along the length of the two pivotally connected units to position and project the third unit.

7. An apparatus of the character set forth comprising three conveyer units, two of said units being pivotally connected end to end and movable with respect to each other about a vertical and a horizontal axis, said units each having longitudinally disposed guideways thereon, and a third conveyer unit movable over said guideways from a position over the first mentioned units to an extended position to form a continuous conveyer of all three units.

8. An apparatus of the character set forth comprising three conveyer units, two of said units being pivotally connected end to end and movable about said pivot with respect to each other, said units each having longitudinally disposed guideways thereon, a third conveyer unit movable over said guideways from a position over the first mentioned units to an extended position to form a continuous conveyer of all three units, and power operated means carried by said apparatus for moving said third conveyer along said guideways.

9. An apparatus of the character set forth comprising three conveyer units, two of said units being pivotally connected end to end and movable about said pivot with respect to each other, said units each having longitudinally disposed guideways thereon, a third conveyer unit movable over said guideways from a position over the first mentioned units to an extended position to form a continuous conveyer of all three units, power operated means carried by said apparatus for moving said third conveyer along said guideways, and portable manually actuated means for controlling the operation of said power operated means.

10. An apparatus of the character set forth comprising three conveyer units, two of said units being pivotally connected end to end and movable about said pivot with respect to each other, said units each having longitudinally disposed guideways thereon, a third conveyer unit movable over said guideways from a position over the first mentioned units to an extended position to form a continuous conveyer of all three units, said third conveyer unit having side frames composed of a plurality of pivotally connected sections to permit said unit to conform to curved surfaces, and power operated means carried by said apparatus for moving said third conveyer along said guideways.

11. An apparatus of the character set forth comprising three conveyer units, two of said units being pivotally connected end to end along a horizontal axis whereby one of said units may move vertically about said pivot with respect to the other unit, said units each having longitudinal guideways thereon, a third conveyer unit movable over said guideways from a position over the first mentioned units to an extended position to form a continuous conveyer of all three units, said third conveyer unit having side frames composed of a plurality of pivotally connected sections to permit said unit to conform to curved surfaces, power operated means carried by said apparatus for moving said third conveyer along said guideways, and portable manually actuated means for controlling the operation of said power operated means.

12. An apparatus of the character set forth comprising three conveyer units, two of said units being pivotally connected end to end along a horizontal axis and a vertical axis whereby one of said units may move vertically and horizontally about said pivots with respect to the other unit, said units each having an endless conveyer and independent power operated means for driving said conveyers, longitudinally disposed guideways carried by each of said units, a third conveyer unit movable over said guideways from a position over the first mentioned units to an extended position to form a continuous conveyer of all three units, said third conveyer unit having side frames composed of a plurality of pivotally connected sections to permit said unit to conform to curved surfaces, an endless conveyer carried by said third unit, power operated means carried by said third unit for driving said endless conveyer, and additional power operated means carried by said apparatus for moving said third unit along said guideways.

13. An apparatus of the character set forth comprising three conveyer units, two of said units being pivotally connected end to end to permit movement of one with respect to the other about the pivotal axis, said units each being wheel supported whereby said units may be moved from storage to operative position, longitudinally disposed guideways carried by each of said units, a third conveyer unit comprising a plurality of wheel supported pivotally connected sections, said third unit being movable along said guideways from a position over the first mentioned units to an extended position to form a continuous conveyer of all three units, and means for moving said third conveyer.

14. In an apparatus of the character set forth, a shed conveyer unit having an endless conveying element, longitudinally disposed guideways carried by the framework of said unit, a second conveyer unit movable over said guideways from a position over said shed unit to an extended position to form a continuous conveyer of both units, and cover plates adapted to be positioned over said guideways when said second unit is in extended position, said cover plates forming a table adjacent the endless conveyer element of said shed section.

15. In an apparatus of the character set forth, a shed conveyer unit comprising two sections pivotally connected together so that one section may be disposed at an angle relative to the other section and having an endless conveying element, longitudinally disposed guideways carried by the framework of each of said sections, a second conveyer unit movable over said guideways from a position over said shed unit to an extended position to form a continuous conveyer of both units, said second conveyer unit being composed of a plurality of wheel supported sections each pivotally connected to adjacent sections whereby said second conveyer unit is rendered flexible and capable of conforming to curved surfaces, and means for moving said second conveyer unit with respect to the first unit.

16. An apparatus of the character set forth comprising three conveyer units, two of said units being pivotally connected end to end and movable with respect to each other about a horizontal axis, means for connecting the third unit to one end of said two connected units whereby the three conveyer units may be extended into a continuous conveyer with the units capable of projection to different horizontal levels relative to each other, and means extending along the length of the two pivotally connected units to extend said third unit and to retract said third unit over said two pivotally connected units.

17. An apparatus of the character set forth comprising two conveyer units pivotally connected end to end and movable with respect to each other about a horizontal axis, a third conveyer unit connected to one end of said two connected units whereby the three conveyer units may be extended into a continuous conveyer with the units capable of projection to different horizontal levels relative to each other, and means extending along the length of the two pivotally connected units to extend said third unit and to retract said third unit over said two pivotally connected units.

18. An apparatus of the character set forth comprising three conveyer units, two of said units being pivotally connected end to end along a horizontal axis and a vertical axis whereby one of said units may move vertically and horizontally about said pivots with respect to the other unit, said units each having an endless conveyer and independent power operated means for driving said conveyers, longitudinally disposed guideways carried by each of said units, a third conveyer unit movable over said guideways from a position over the first mentioned units to an extended position to form a continuous conveyer of all three units, an endless conveyer carried by said third unit, power operated means carried by said third unit for driving said endless conveyer, and additional power operated means carried by said apparatus for moving said third unit along said guideways.

19. In an apparatus of the character set forth, a shed conveyer unit having a framework and an endless conveying element, longitudinally disposed guideways carried by the framework of said unit, a second conveyer unit movable over said guideways from a position over said shed unit to an extended position to form a continuous conveyer of both units, a plurality of arms secured to and projecting laterally from the framework of the shed conveyer unit, and cover plates hinged to said arms adapted to be positioned over said guideways when said second unit is in extended position, said cover plates forming a table adjacent the endless conveyer element of said shed section.

20. An apparatus of the character set forth comprising three conveyer units, two of said units being pivotally connected end to end to permit movement of one with respect to the other about the pivotal axis, said pivotally connected units each being wheel supported whereby said pivotally connected units may be moved from storage to operative position, longitudinally disposed guideways carried by each of said pivotally connected units, and a third conveyer unit comprising a plurality of wheel supported pivotally connected sections, said third unit being movable along said guideways from a position over the pivotally connected units to an extended position to form a continuous conveyer of all three units.

21. An apparatus of the character set forth comprising three conveyer units, two of said units being pivotally connected end to end and movable about said pivot with respect to each other, the third unit being movable longitudinally of the first two mentioned units whereby said third unit may be positioned over said first two units or projected longitudinally thereof to form a continuous conveyer of all three units, means extending along the length of the two pivotally connected units to position and project the third unit, and power means in one of said pivotally connected units to operate said first-named means.

WILLIAM BISSET.